No. 890,106. PATENTED JUNE 9, 1908.
D. L. TSCHANTZ.
ROLLER BEARING.
APPLICATION FILED AUG. 8, 1907.

Witnesses
Harry O. Rastetter
Sylvia Boron

Inventor
David L. Tschantz
F. W. Bond
By
Attorney

UNITED STATES PATENT OFFICE.

DAVID L. TSCHANTZ, OF CANTON, OHIO.

ROLLER-BEARING.

No. 890,106.  Specification of Letters Patent.  Patented June 9, 1908.

Application filed August 8, 1907. Serial No. 387,612.

*To all whom it may concern:*

Be it known that I, DAVID L. TSCHANTZ, a citizen of the United States, residing at Canton, in the county of Stark and State of Ohio, have invented certain new and useful Improvements in Roller-Bearings; and I do hereby declare that the following is a full, clear, and exact description of the same, reference being had to the annexed drawing, making a part of this specification, and to the numerals and figures of reference marked thereon, in which—

Figure 1:
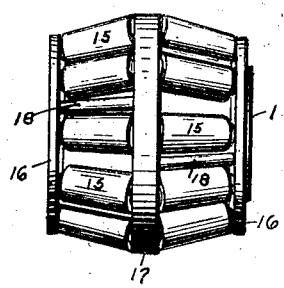
Figure 2:
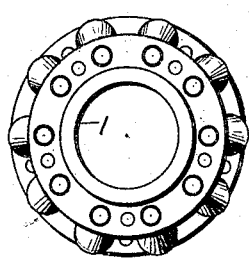
Figure 3:
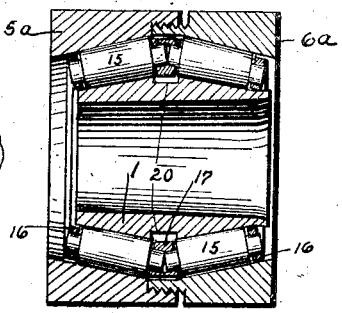
Figure 4:
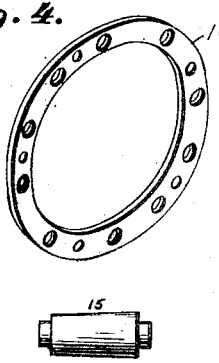
Figure 5:
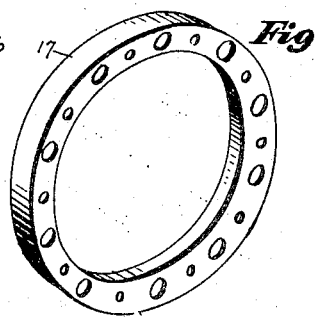
Figure 6:
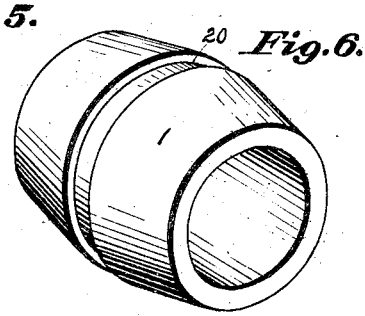
Figure 8:
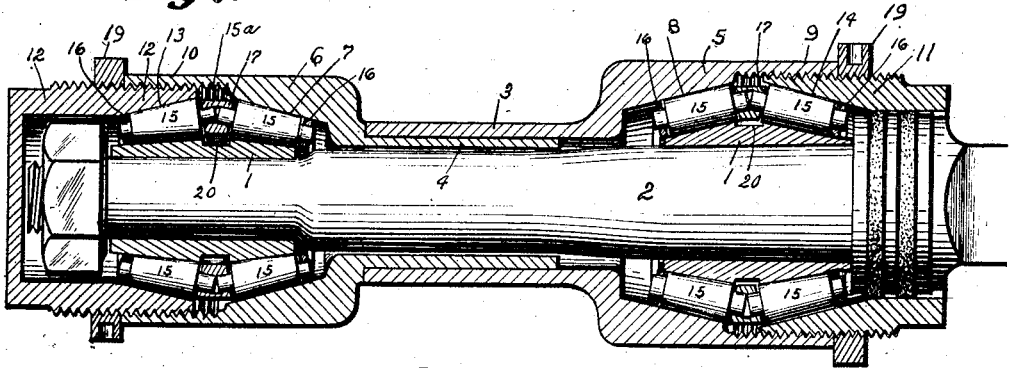

Figure 1 is a side elevation of the roller bearing rings showing the rollers in proper relative position. Fig. 2 is an end view showing the different parts placed in proper position, also showing the cone. Fig. 3 is a sectional view showing modified cups attached. Fig. 4 is a detached view of one of the outer cage rings. Fig. 5 is a detached view of the center cage ring. Fig. 6 is a detached view of the cone. Fig. 7 is a detached view of one of the rollers. Fig. 8 is a sectional view showing all of the different parts properly assembled and the axle in position.

The present invention has relation to roller bearings, and it consists in the novel arrangement described and particularly pointed out in the claims.

Similar numerals of reference indicate corresponding parts in all the figures of the drawing.

In the accompanying drawing, 1 represents one of the cone-sleeves, which cone-sleeves are located upon the axle 2 substantially as shown in Fig. 8. The relatively fixed roller-bearing cup members 3 and 4 are telescoped together and are each provided with the enlarged cup portions 5 and 6, which cup portions are provided with beveled inner surfaces 8 and 7. The cups 5 and 6 are provided with the screw threaded extensions 9 and 10 into which screw threaded extensions are entered the relatively adjustable bearing cups or collars 11 and 12, which cups or collars are provided with the beveled peripheries 14 and 13, said beveled peripheries corresponding in angularity with the beveled inner peripheries of the cups 5 and 6, and for the purpose hereinafter described, the cups or collars 11 and 12 are adjustably attached by screw threads to the cups 5 and 6. The bearing rollers 15 are journaled at their ends to the cage rings 16 and 17, which cage rings are held in proper spaced relationship with reference to each other by means of the tie rivets 18. In assembling the bearing rollers the center cage ring 17 and one of the outer cage rings 16 together with one set of the rollers 15 are properly connected together, after which the cone-sleeves 1 are placed in proper position and the remaining outer cage ring and the remaining set of rollers are properly connected by the rivets 18.

It will be understood that after the rollers and the cage rings have been properly connected the cone shaped sleeve 1 could not be inserted, owing to the fact that the cone sleeve is of greater diameter at its center or mid-way between its ends than the outer cage ring 16.

It will be understood that the cups 5 and 6 are to be placed in the hub of a vehicle wheel in the usual manner, but this feature does not have any reference to the present invention.

For the purpose of locking the cup-members 11 and 12 in proper adjustment, the rings 19 are provided, which rings are located each upon the screw threaded peripheries of the cups or collars 11 and 12. The outer cup or collar 12 is closed at its outer end and is so formed for the purpose of providing a dust cap. The bearing rollers 15 are slightly tapered and are so tapered for the purpose of properly fitting the periphery of the cone sleeve 1 and the inner beveled surfaces of the outer and inner cups. The rollers 15 are inclined in opposite directions from the center cage ring 17 and are so inclined for the purpose of taking the end thrust of the axle 2. It will be understood that there is some end movement of the axle 2, and by providing the oppositely inclined bearings they will receive the thrust in both directions. By adjustably connecting the cups or collars 11 and 12 to the cups 5 and 6 I am enabled to take up the wear from time to time, thereby providing a means for properly adjusting the rollers to the different parts, with which said rollers come in contact. By providing the center cage ring 17 there is a space between the inner ends of the oppositely inclined bearing rollers 15 at which point the surface of the cone-sleeve will not receive any wear and in order to prevent the formation of a ridge upon the center portion of the cone shaped sleeve 1, said center portion is provided with the annular groove 20, which annular groove is located directly beneath the center cage ring 17 when the different parts are properly assembled.

Each roller cage is provided with two sets of rollers inclined in opposite directions as above described and for the purpose specified, that is to say to so locate the two sets of rollers of each cage containing the rollers in such position that when the cups or collars 11 and 12 are properly adjusted the rollers 15 will be brought in proper contact with the peripheries of the cone-sleeves and the inner inclined surfaces of the cups 5 and 6 and the cups or collars 11 and 12. The rollers 15 being provided at their ends with reduced portions 15$^a$ for the purpose of being journaled in the rings 16 and 17 necessarily have shoulders upon them at the point where such reduced portions end and the roller proper begins. The inner ends of the rollers 15 by means of their reduced portions at those ends provided, are journaled in the rings 17. To prevent the shoulders upon the inner ends of said rollers 15 from coming into contact with the ring 17 and providing friction at that point the reduced portions of said rollers 15 are made of sufficient length to enter the bearings provided for them in the ring 17, and to permit said reduced portions to meet or abut end to end in pairs in said ring 17. These ends then may rotate together within the bearings in the ring 17 and the shoulders on the rollers 15 are thus prevented from coming into direct contact with the rings 17 and preventing any end thrust of said rollers against said ring.

In Fig. 3 I illustrate a modification which consists in forming the cups 5$^a$ and 6$^a$ of a length to correspond substantially with the length of the roller bearing cage, which parts are formed separate from the hub and are adjustably connected together by screw threads. All of the parts shown in Fig. 3 constitute what might be termed a self contained structure designed to be placed in the hub of a wheel.

It will be understood that the present invention can be applied to other bearings than axle bearings or wheel bearings as it is of no importance whether the outer member revolves or the inner member or spindle revolves and hence I do not desire to be confined to the specific class of bearings, herein described, or in other words vehicle axle bearings.

Having fully described my invention what I claim as new and desire to secure by Letters Patent, is—

1. In a roller-bearing, cup members provided with cup sections, said cup sections provided with screw threaded extensions, cups or collars adjustably attached to the screw threaded extensions of the cup sections, cone-sleeves each having oppositely inclined peripheries, there being a groove located between the oppositely inclined peripheries of each cone sleeve, roller cages and sets of rollers journaled in the cages the rollers being inclined in opposite directions, substantially as and for the purpose specified.

2. In a roller bearing, a sleeve, its periphery inclined in opposite directions and provided with a groove between the oppositely inclined portions of the sleeve, a roller cage, consisting of rings connected together, rollers journaled in the rings, said rollers consisting of sets inclined in opposite directions, and cups adjustably connected together and adapted to surround the rollers, substantially as and for the purpose specified.

3. In a roller bearing, the combination of oppositely inclined cone-sleeves, relatively fixed bearing cups and relatively adjustable bearing cups connected to the fixed bearing cups, roller cages consisting of rings, rollers journaled in the rings, said rollers consisting of annular sets inclined in opposite directions arranged in endwise relation to each other and rings adjustably connected to the relatively adjustable bearing cups, substantially as and for the purpose specified.

4. In a roller bearing, the combination of oppositely inclined cone-sleeves, relatively fixed bearing cups and relatively adjustable bearing cups connected to the relatively fixed bearing cups, roller cages consisting of rings, rollers journaled in the rings, said rollers consisting of annular sets inclined in opposite directions arranged in endwise relation with each other, rings adjustably connected to the relatively adjustable bearing cups, and the outer bearing cup constituting a dust cap, substantially as and for the purpose specified.

5. In a roller bearing of the class described, a cage consisting of rings spaced from each other, rollers journaled in the rings and the inner reduced ends or bearings of said rollers abutted against each other, a sleeve and bearing cups said rollers located between said bearing cups and sleeve, substantially as and for the purpose specified.

6. In a roller bearing, a roller cage, two sets of rollers arranged in end to end relation and inclined at an angle to each other, the cage having a member forming a bearing for the inner ends of both sets of rollers, and the rollers of the two sets having their journal portions abutted endwise in said member, substantially as and for the purpose specified.

In testimony that I claim the above, I have hereunto subscribed my name in the presence of two witnesses.

DAVID L. TSCHANTZ.

Witnesses:
J. A. JEFFERS,
F. W. BOND.